Dec. 23, 1952          G. P. BARKER          2,622,449
BUCKET PIN FOR DREDGING APPARATUS
Filed May 14, 1949          2 SHEETS—SHEET 1
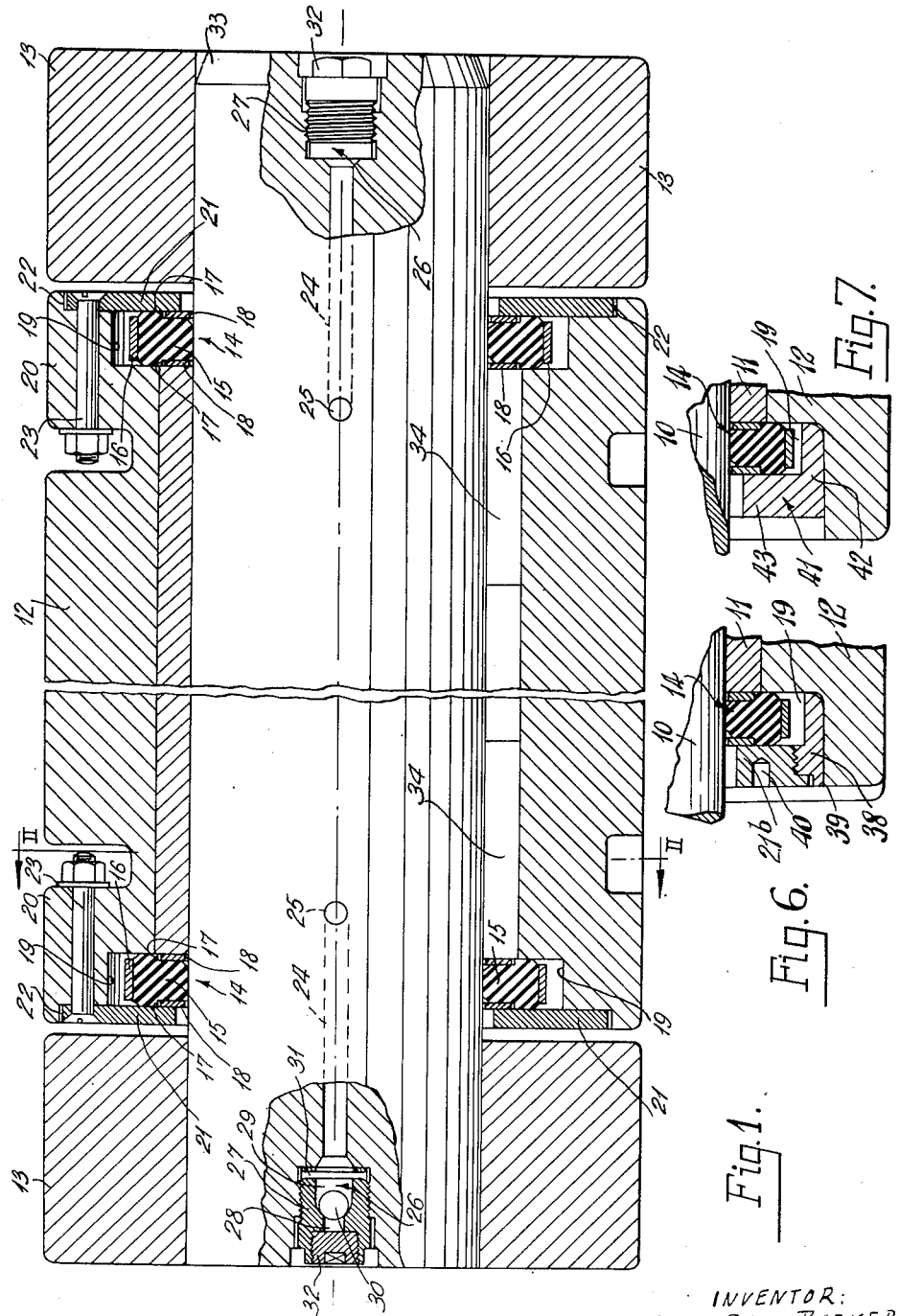
INVENTOR:
George Paton BARKER Dec. 23, 1952          G. P. BARKER          2,622,449
BUCKET PIN FOR DREDGING APPARATUS
Filed May 14, 1949          2 SHEETS—SHEET 2
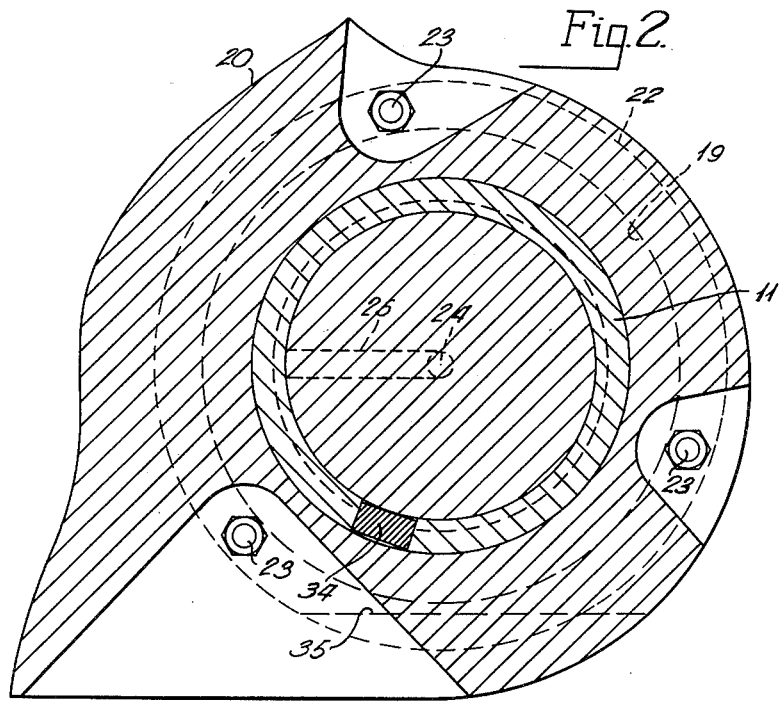
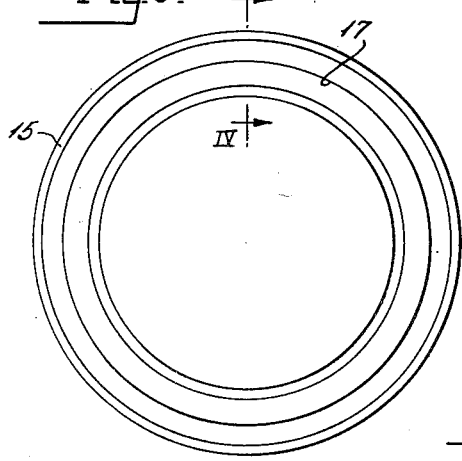
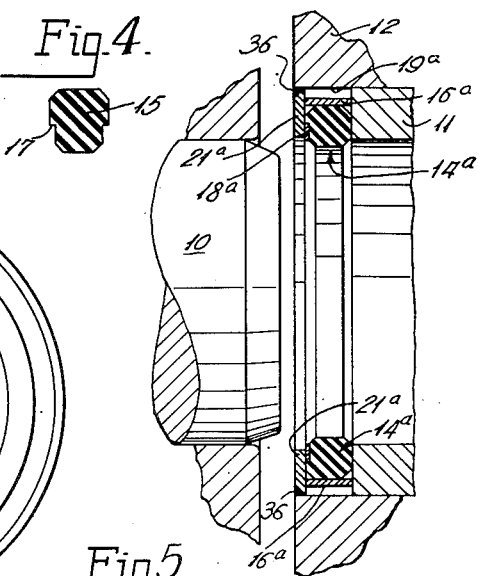
INVENTOR:
George Paton BARKER
Attorney Patented Dec. 23, 1952

2,622,449

UNITED STATES PATENT OFFICE 2,622,449

BUCKET PIN FOR DREDGING APPARATUS

George Paton Barker, Ipoh, Malaya

Application May 14, 1949, Serial No. 93,359
In Great Britain May 20, 1948

15 Claims. (Cl. 74—257)

This invention relates to dredging apparatus and is more particularly concerned with an improved construction of pin bearing arrangement for dredger bucket mechanism.

One object of the invention is to provide an improved form of pin bearing arrangement giving increased useful life, less frictional loss and less noise in operation with reduced wear and increased efficiency.

Another object of the invention is to provide an improved pin bearing construction for use in dredging apparatus which is effectively resistant to the abrasive influence to which the various parts of the apparatus are subjected when in use.

A further object of the invention is to provide an improved bearing for the bucket pin or the like of dredging mechanism of the ladder type by which each exposed end of the pin bearing surface is provided with a fully floating seal by which lubricant injected to the bearing surface is effectively retained.

A further object of the invention is to provide a bearing arrangement comprising a bearing pin, an eye member surrounding said pin and having a bearing surface in rotatable bearing engagement therewith, means for introducing a lubricant to said bearing surface in engagement with said pin and a packing gland at each exposed end of said bearing surface, said packing gland comprising a packing ring which is free to partake of a floating movement in a plane substantially normal to the axis of said pin and which has an inner surface in sealing contact with the peripheral surface of said pin and which also has at least one planar wall surface disposed in a plane normal to said pin axis and arranged for sealing engagement with a similar wall surface of said bearing eye member.

In order that the invention may be readily understood two practical embodiments thereof will now be described with reference to the accompanying drawings in which:

Figure 1 is a longitudinal sectional elevation of a bucket pin bearing construction according to this invention.

Figure 2 is a transverse section taken on the line II—II of Fig. 1.

Figure 3 is an end elevation and Figure 4 a cross section of the rubber packing ring used in the embodiment of Figures 1 and 2.

Figure 5 is a fragmentary view, similar to part of Fig. 1, showing an alternative construction, particularly adapted for applying the invention to existing bucket devices.

Figures 6 and 7 are fragmentary views similar to part of Fig. 1, showing two further modified constructions.

Referring first to Figs. 1 to 4, reference numeral 10 indicates the bucket pin which is in rotatable bearing engagement in the usual way with a bearing sleeve 11 carried in the back eye 12 of the dredger bucket. The opposite ends of the bucket pin are carried, again in the normal manner, in the ladder or front eye elements 13.

Instead of the usual plain unlubricated bearing construction, provision is made to effect a positive supply of grease lubricant to the bearing surface between the sleeve 11 and the pin 10.

For this purpose a packing gland or seal, indicated generally at 14, is disposed at each end of the sleeve 11 between the body of the eye 12 and the bucket pin, so as to retain the applied lubricant in spite of the wear which takes place.

Each seal 14 comprises an annulus or ring 15 of suitable rubber material fitting snugly within a short tubular metal ring 16 disposed around its outer circumferential surface. Towards its bore, each radial side wall of the rubber ring is recessed as shown at 17 for the accommodation of two thin annular metal rings 18. The assembly of rubber and metal rings is then housed within a chamber 19 formed in a boss 20 at each end of the eye, the assembly being retained in position by means of a retaining plate 21 secured within a complementary recess 22 of the boss by fixing bolts 23.

The bucket pin 10 is provided at each end with an inwardly directed axial bore 24 which communicates at its inner end with a radial bore 25. The two radial bores 25 are positioned on the pin 10 so as to lie one at each end of the bearing surface length of the sleeve 11.

At the outermost end of each bore 24, disposed on the axial line of the bucket pin, there is provided a non-return valve indicated generally at 26 and each comprising a screwed plug body 27 entering a suitably tapped hole in the pin. This body is provided with an inlet orifice 28 communicating with an enlarged counterbore 29 to form a seating for a valve ball 30. The counterbore 29 communicates with the adjacent axial bore 25 while a cross pin 31 serves to prevent undue displacement of the ball away from its seating. The outermost end of the inlet orifice 28 is normally closed by a removable screw plug 32.

To effect lubrication, one of the plugs 32 is removed and grease supplied under pressure past the ball 30 to enter the bearing space between the sleeve 11 and pin 10 by way of the bores 24 and 25. By the provision of bores and their associated non-return valves at each end of the bucket pin, an improved method of lubrication may be effected in the following manner: Grease is applied under pressure, as before, by way of one ball valve while the other valve at the opposite end of the pin is held open by suitable application of pressure to the ball. The fresh grease, in proceeding from one radial bore 25 into the bearing space between the surfaces and spreading towards the opposite end, displaces the existing grease which is discharged by way of the other and now inoperative ball valve, thus providing for a positive circulation of fresh grease over the bearing surface areas. Desirably, of course, with this method the same grease inlet and outlet operations are performed at the same ends each time the bearing is greased.

Each packing gland or seal 14 is, it will be observed, fully floating in a radial direction whereby they can follow the bucket pin in any displacement thereof due to wear or to the initial clearance usually provided. The internal bore diameter of the rubber ring is made initially very slightly smaller, e. g. not more than ¼ inch less, than the pin diameter so that the pin on entry thereunto distorts the rubber and provides the initial pressure seal. One end of the bucket pin is preferably tapered to a slight extent as shown at 33 to facilitate its insertion while the corners of the ring 15 are conveniently chamfered as shown to allow the necessary distortion of the rubber.

The material used for the ring 15 is desirably of a grade of rubber that will absorb grease and swell in consequence but without undue change or deterioration in its rubber-like characteristics. Rubber known in the trade as "Linatex"-rubber or "Wilkinson process rubber" and made in accordance with the disclosure of the British Patent No. 437,928, filed on April 2, 1935 and granted to B. Wilkinson has been found satisfactory. Upon the occurrence of swelling after absorption of grease, an increased sealing pressure is set up around the surface of the pin 10 and between the packing ring and the sides of th chamber 19 which is automatically maintained as more grease is absorbed. Such swelling has been found sufficient to maintain adequate sealing until at least a quarter of the original volume of rubber has disappeared. The packing is thus effectively self-adjusting and needs no attention for prolonged periods.

The bearing sleeve 11 is shown as of the axially split type and retained by wedges 34. In view of the greatly decreased wear occasioned by the positive lubrication afforded by the invention the conventional thickness of bearing sleeve may be much reduced while in some circumstances it may be possible to dispense with the sleeve entirely thereby removing one of the major difficulties which at present arise with wedge-fixed bearing sleeves, that of straining and cracking of the bucket eye thereby.

In the embodiment shown the recess 22 for the retaining plate 21 is assumed to be machined out but if such recess is cast then a flat, as shown at 35 in Fig. 2 may be provided, thereby leaving a landing which allows for maximum wear of the bucket at this point without fear of the retaining flange 21 becoming exposed to the tread.

Fig. 5 shows a modified arrangement for adapting the invention to existing bucket constructions. In this embodiment, chambers 19a for accommodating the packing gland 14a are provided at each end of the bearing sleeve by appropriate shortening of the latter.

The packing gland is of slightly simplified form having an outer metal ring 16a, as before, but being provided in this instance with only one annular metal ring 18a, disposed towards the outer end of the bucket eye. The opposite side of the ring enters into direct contact with the end of the bearing sleeve. The sealing ring is retained by an annular retaining plate 21a which is made a snug fit within the sleeve-receiving bore of the bucket eye and is held in place by several spot welds as shown at 36.

The assembly and operation of this modification is substantially identical with that of the embodiment previously described although only one non-return valve may be used, located at the head end of the bucket pin 10.

Fig. 6 shows a modified version of the arrangement of Fig. 1 in which the retaining plate, in this instance is in the form of an externally threaded ring 21b screwed into a separate bushing 38 which is housed, in tight-fitting relationship, within the chamber 19 and secured by welding as at 39. The packing ring assembly is of the form already described in connection with Figs. 1–4 and can readily be removed and renewed by unscrewing the ring 21b. Holes 40 are conveniently provided in the ring to facilitate its rotation by a suitable tool.

Fig. 7 shows a further and simplified modification in which the packing ring assembly, again of the form previously described, is held in operative position by a simple L-section ring member 41 whose axially directed rim portion 42 is in tight-fitting engagement within the chamber 19 whereby the radially-directed portion 43 of the ring member constitutes a retaining wall for the packing ring. The axial length of the rim portion 42 is made such as will automatically provide the correct clamping conditions for the packing ring.

If desired, only one end of the bucket pin need be provided with a non return valve for entry of the lubricant grease, the opposite end being provided with a screwed plug or other device, preferably of a form by which its sealing function may be suspended, as by slight rotation, while still retaining the device in position within the pin.

I claim:

1. In a bearing arrangement for dredging apparatus, a bearing pin, an eye member surrounding said pin and having a bearing surface in rotatable bearing engagement therewith, means for introducing lubricant to said bearing surface, a packing gland at each exposed end of said bearing surface, said packing gland comprising a ring of packing material disposed so as to be capable of a fully-floating movement in a plane substantially normal to the axis of said pin and having an inner circumferential surface in sealing contact with the peripheral surface of said pin and also having a side wall surface disposed in a plane parallel to that of said plane of floating movement, said eye member having a planar wall surface parallel with said plane of floating movement, and means for maintaining said side wall surface of said ring in sealing engagement with said wall surface of said eye member.

2. In a bearing arrangement for dredging apparatus, a bearing pin, an eye member surrounding said pin and having a bearing surface in rotatable bearing engagement therewith, an outwardly extending annular chamber in said eye member at at least one end of said bearing surface, said chamber having parallel opposing planar side walls which are disposed substantially normal to the axis of said pin, means for introducing lubricant to said bearing surface, and a packing gland comprising a ring of packing material, said packing gland having an inner circumferential surface in sealing contact with the peripheral surface of said pin, and said packing gland having the surfaces of its side walls disposed in planes substantially parallel to the planes of the planar side walls of said chamber and having an outer circumferential surface of a diameter smaller than the diameter of the inner circumferential surface of said annular chamber whereby said packing gland is disposed so as to be capable of a fully-floating movement in a plane substantially normal to the axis of said pin.

3. In a bearing arrangement for dredging apparatus, a bearing pin, an eye member surrounding said pin and having a bearing surface in rotatable bearing engagement therewith, said eye member having an annular recess at at least one end of said bearing surface, said annular recess having a planar side wall disposed substantially normal to the axis of said pin, means for introducing lubricant to said bearing surface, a packing gland comprising a ring of packing material, said packing gland having an inner circumferential surface in sealing contact with the peripheral surface of said pin and also having a side wall surface disposed in a plane substantially parallel to the plane of said planar side wall of the recess, and means for maintaining said side wall surface of said ring in sealing engagement with said planar side wall of the recess, said packing gland having an outer circumferential surface of a diameter smaller than the diameter of the inner circumferential surface of said annular recess, and said packing gland thus being disposed so as to be capable of a fully-floating movement in a plane substantially normal to the axis of said pin.

4. In a bearing arrangement, a bearing pin, an eye member surrounding said pin and having a bearing surface in rotatable bearing engagement therewith, means for introducing lubricant to said bearing surface, a packing gland at each exposed end of said bearing surface, said packing gland comprising a confined ring of rubber disposed so as to be capable of a fully-floating movement in a plane substantially normal to the axis of said pin and having an inner cylindrical surface in sealing contact with the peripheral surface of said pin and also having a planar side wall surface disposed in a plane parallel to that of said plane of floating movement, said eye member having a similar planar wall surface parallel with said plane of floating movement, and means for maintaining said side wall surface of said ring in sealing engagement with said side wall surface of said eye member.

5. In a bearing arrangement for dredging apparatus, a bearing pin, an eye member surrounding said pin and having a bearing surface in rotatable bearing engagement therewith, an outwardly extending annular chamber in said eye member at at least one end of said bearing surface, said chamber having parallel opposing planar side walls which are disposed substantially normal to the axis of said pin, means for introducing lubricant to said bearing surface, and a packing gland comprising a ring of rubber, said packing gland having an inner circumferential surface in sealing contact with the peripheral surface of said pin, and said packing gland having the surfaces of its side walls disposed in planes substantially parallel to the planes of the planar side walls of said chamber and having an outer circumferential surface of a diameter smaller than the diameter of the inner circumferential surface of said annular chamber whereby said packing gland is disposed so as to be capable of a fully-floating movement in a plane substantially normal to the axis of said pin.

6. In a bearing arrangement for dredging apparatus, a bearing pin, an eye member surrounding said pin and having a bearing surface in rotatable bearing engagement therewith, said eye member having an annular recess at at least one end of said bearing surface, said annular recess having a planar side wall disposed substantially normal to the axis of said pin, means for introducing lubricant to said bearing surface, a packing gland comprising a ring of rubber, said packing gland having an inner circumferential surface in sealing contact with the peripheral surface of said pin and also having a side wall surface disposed in a plane substantially parallel to the plane of said planar side wall of the recess, and means for maintaining said side wall surface of said ring in sealing engagement with said planar side wall of the recess, said packing gland having an outer circumferential surface of a diameter smaller than the diameter of the inner circumferential surface of said annular recess, and said packing gland thus being disposed so as to be capable of a fully-floating movement in a plane substantially normal to the axis of said pin.

7. In a bearing arrangement for dredging apparatus, a bearing pin, an eye member surrounding said pin and having a bearing surface in rotatable bearing engagement therewith, an outwardly extending annular chamber in said eye member at at least one end of said bearing surface, said chamber having parallel opposing planar side walls which are disposed substantially normal to the axis of said pin, means for introducing lubricant to said bearing surface, and a packing member in said annular chamber, said packing member comprising a confined ring of rubber having the capacity of absorbing grease lubricant and swelling in consequence thereof without undue deterioration and being arranged so as to be capable of a fully-floating movement within said chamber with an inner circumferential surface thereof in sealing contact with the peripheral surface of said pin and with its side wall surfaces in sealing engagement with the opposing wall surfaces of said chamber.

8. A bearing arrangement according to claim 7 wherein said confined ring of rubber is of substantially rectangular cross-section and is provided with a short snug-fitting metal cylinder surrounding its outer circumferential surface.

9. A bearing arrangement according to claim 7 wherein said confined ring of rubber is of substantially rectangular cross-section and is provided with a short snug-fitting metal cylinder surrounding its outer circumferential surface and with a metal annulus flanking at least one of the radial side wall surfaces in sealing engagement with said chamber.

10. A bearing arrangement according to claim 7 wherein said confined ring of rubber is of substantially rectangular cross-section and is provided with a short snug-fitting metal cylinder surrounding its outer circumferential surface and has a metal annulus flanking each of its radial side wall surfaces in sealing engagement with said chamber.

11. A bearing arrangement according to claim 7 wherein said confined ring of rubber is of substantially rectangular cross-section and is provided with a short snug-fitting metal cylinder surrounding its outer circumferential surface and with a metal annulus recessed into and flanking at least one radial side wall surface thereof for entering into sealing engagement with said chamber.

12. A bearing arrangement according to claim 7 wherein said means for introducing lubricant comprises a bore in said pin between an exposed end thereof and a peripheral region thereof in engagement with said bearing surface of said eye member and a non-return valve positioned in said bore to prevent return movement of injected lubricant towards said exposed end of the pin.

13. A bearing arrangement according to claim 7 wherein said means for introducing lubricant comprises an inlet bore from an exposed end of said pin to a peripheral region thereof in engagement with one end of said bearing surface and an outlet bore from an exposed end of said pin to a peripheral region thereof in engagement with the opposite end of said bearing surface and a non-return valve in at least one of said bores for maintaining uni-directional flow of lubricant.

14. A bearing arrangement for a dredger bucket comprising a bearing pin, a back eye member of one bucket surounding the mid-region of said pin and having a bearing surface in rotatable bearing engagement therewith, spaced front eye members of another bucket embracing opposite end regions of said pin, means for securing said pin in said front eye members, annular rectangular cross-section chambers at each end of said bearing surface of said back eye, each chamber having parallel planar side walls disposed substantially normal to the axis of said pin, a packing gland in each of said chambers, each of said packing glands comprising a confined ring of rubber of a type capable of absorbing grease and swelling in consequence thereof without undue deterioration, each of such rubber rings having an inner circumferential surface in sealing engagement with the peripheral surface of said pin and opposing planar side surfaces in sealing engagement with said side walls of said chamber, said chambers being of sufficient size to permit a fully-floating movement of each ring therein in a plane parallel to that of said side walls of said chamber, and means for introducing grease lubricant to said bearing surface between said pin and said back-eye.

15. In a bearing arrangement, a bearing pin, an eye member surrounding said pin and having a bearing surface in rotatable bearing engagement therewith, means for introducing lubricant to said bearing surface, a packing gland at each exposed end of said bearing surface, said packing gland comprising a confined ring of rubber having the capacity of absorbing grease lubricant and swelling in consequence thereof without undue deterioration, said packing gland being disposed so as to be capable of a fully floating movement in a plane substantially normal to the axis of said pin and having an inner cylindrical surface in sealing contact with the peripheral surface of said pin and also having a planar side wall surface disposed in a plane parallel to that of said plane of floating movement, said eye member having a similar planar wall surface parallel with said plane of floating movement and means for maintaining said side wall surface of said ring in sealing engagement with said side wall surface of said eye member.

GEORGE PATON BARKER.

REFERENCES CITED

The following references are of record in the file of this patent:

UNITED STATES PATENTS

| Number | Name | Date |
|---|---|---|
| 436,008 | Robinson | Sept. 9, 1890 |
| 832,816 | Sellers | Oct. 9, 1906 |
| 1,289,408 | Davis | Dec. 31, 1918 |
| 1,747,744 | Venable | Feb. 18, 1930 |
| 2,241,820 | Kohn | May 13, 1941 |
| 2,283,871 | Norelius | May 19, 1942 |